United States Patent [19]
Orchard et al.

[11] Patent Number: 5,088,676
[45] Date of Patent: Feb. 18, 1992

[54] COMPACT HEIGHT ADJUSTABLE BASE FOR A DISPLAY

[75] Inventors: Anthony R. Orchard, Wantagh; Brian K. Fisher, Douglaston, both of N.Y.

[73] Assignee: NCR Corporation, Dayton, Ohio

[21] Appl. No.: 213,879

[22] Filed: Jun. 30, 1988

[51] Int. Cl.[5] .............................................. F16M 11/00
[52] U.S. Cl. .................................... 248/421; 248/922; 248/587; 248/292.1; 248/280.1; 248/281.1
[58] Field of Search .................. 248/421, 292.1, 289.1, 248/587, 371, 372.1, 162.1, 1 A–1 J, 281.1, 280.1, 917–924

[56] References Cited

U.S. PATENT DOCUMENTS

| | | | |
|---|---|---|---|
| D. 275,431 | 9/1984 | Usah | D6/429 |
| 3,295,809 | 6/1963 | Smela et al. | 248/204 |
| 3,423,060 | 1/1969 | Fulling et al. | 248/587 |
| 3,504,881 | 4/1970 | Pillons et al. | 248/587 |
| 3,874,728 | 4/1975 | Weiland | 248/421 X |
| 4,047,759 | 9/1977 | Koscinski | 248/587 X |
| 4,447,031 | 5/1984 | Souder, Jr. et al. | 248/280 |
| 4,516,751 | 5/1985 | Westbrook | 248/276 |
| 4,570,892 | 2/1986 | Chech et al. | 248/372.1 |
| 4,691,886 | 9/1987 | Wendling et al. | 248/162.1 |
| 4,708,312 | 11/1987 | Rohr | 248/280 |
| 4,729,533 | 3/1988 | Hillary et al. | 248/1 C X |

FOREIGN PATENT DOCUMENTS 0117639 1/1984 European Pat. Off. .
2847135 10/1978 Fed. Rep. of Germany .

OTHER PUBLICATIONS

Wyse Technology, bulletin "Height-Adjustable Arm User's Map", copyright 1985.

*Primary Examiner*—Alvin C. Chin-Shue
*Attorney, Agent, or Firm*—Jack R. Penrod

[57] ABSTRACT

A compact and inexpensive height adjustable base for a video display. The invention provides height adjustment while maintaining a constant screen orientation with respect to the horizontal. This base is designed for a seated user. It keeps the footprint of the base to a minimum, and by proper shaping, allows most keyboards to share some of its footprint area. The minimum height is only slightly higher than the height of non-adjustable bases, and the maximum height is selected to provide a convenient height for viewing by operators of any stature, and to keep the structural requirements of the stress bearing components low. By keeping the structural requirements low, the material and assembly costs may be kept low, leading to a cost effective height adjustable base.

16 Claims, 3 Drawing Sheets

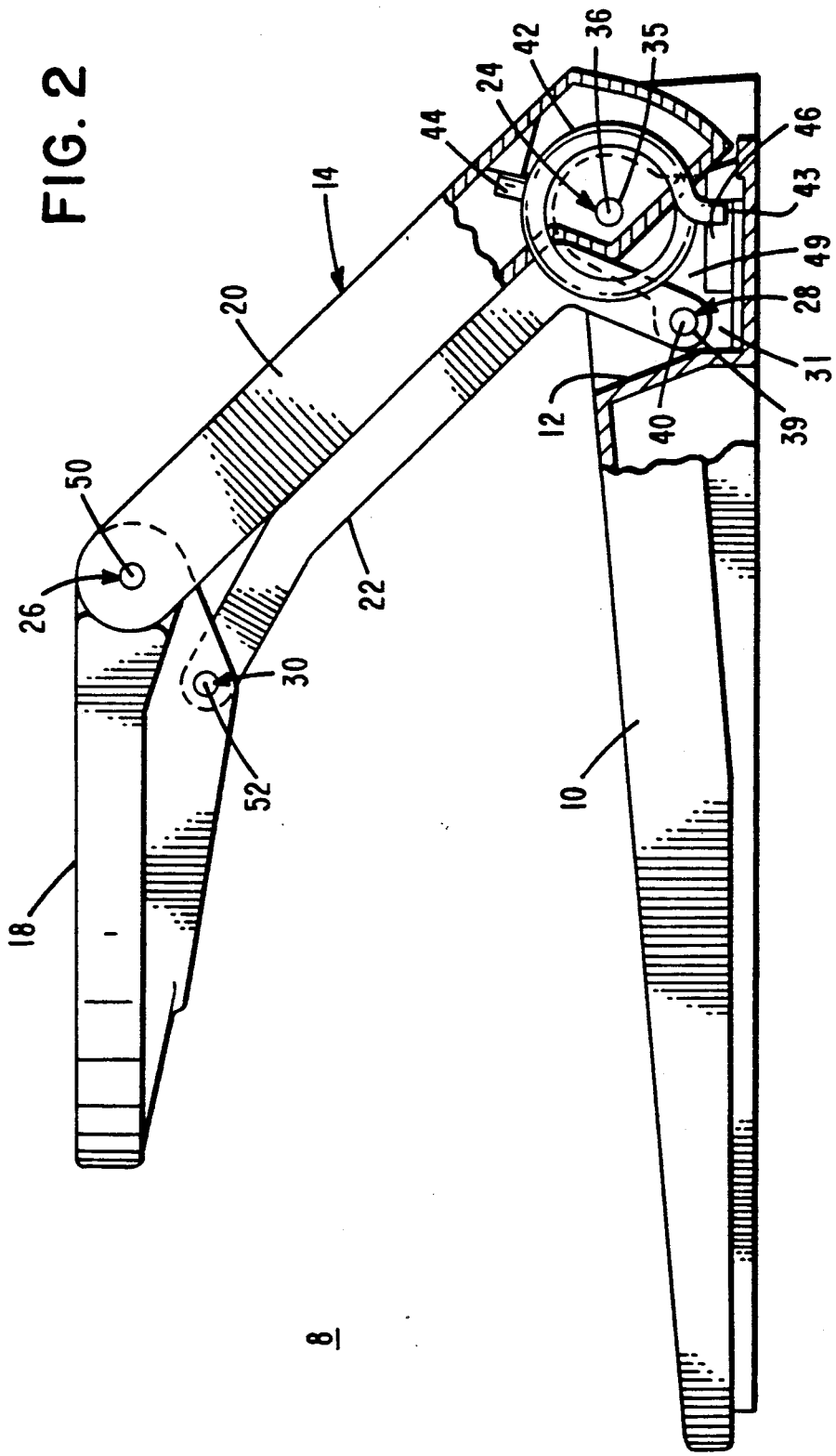

COMPACT HEIGHT ADJUSTABLE BASE FOR A DISPLAY

BACKGROUND OF THE INVENTION

The present invention relates to video display bases and, more particularly to video display bases which are height adjustable.

The need for a height adjustable video display is well known. This need occurs because of the inherent difference between the level of a keyboard for efficient data entry and the level of a display unit for efficient viewing by a seated operator. Thus, some artifice or mechanism is required to increase the level of the display unit to a better viewing height. Moreover, since some artifice or mechanism is required, it is economically expedient, from a supplier standpoint, to provide a single adjustable base to accommodate the differences in the stature of operators rather than a series of bases of graduated heights. Most video display bases allow side-to-side swiveling and forward to back tilting. Additionally, for ease of viewing, a height adjustable base should provide the feature of maintaining a fixed screen orientation relative to the operator and the supporting surface throughout all height adjustments.

Federal Republic of Germany Offenlegungsschrift No. 2,847,135 published May 8, 1980 and assigned to Nixdorf A. G. shows, a data display device mounted upon one type of height adjustable base. This known height adjustable base has a weighted, stationary part and a turnable platform part which is locked into the weighted stationary part, as shown in FIG. 6 of Offenlegungsschrift No. 2,847,135. The turnable platform provides side-to-side swiveling. On the rear of the turnable platform is a hinge. This hinge connects the turnable platform with a height adjustable arm. The hinge and arm are spring loaded to counterbalance the weight of a data display device when it is mounted in its operating position. At the end of the height adjustable arm is a tilting mounting bracket for attachment to the data display device. A helical screw pivots the tilting bracket to the operator's desired orientation. The height adjustable arm has two main rods, one on each side of the hinge, and two auxiliary rods, each associated with a respective main rod. The main rods support the weight of the data display device, while the auxiliary rods tilt the mounting bracket in order to maintain a constant orientation of the face of the data display with the horizontal throughout all height adjustments.

The problem of this known design is that a heavy base which projects in all directions, is necessary in order to provide stability during a swiveling of the platform. It is not surprising, therefore, that this known height adjustable base is large in diameter and circular in shape. But, this means that the base inherently occupies a large amount of workspace. Moreover, this known device, because of its large size and substantial weight, is manufactured substantially of metal components which leads to high material and high assembly/-manufacturing costs.

Another known height adjustable base is described in Document 880151-01B published December 1985 by Wyse Technology and has been sold by Wyse also. The Wyse base has a tilting and swiveling platform at the top of a pair of parallel, height adjustable arms. If the center of gravity of the data display is substantially positioned over the pivot point of the swiveling platform, then the height adjustable base and the data display will remain stable as the data display is moved. Because of the stability achieved by placing the swivel mounting atop the height adjustable arms, the sides of the base portion can be made smaller than the device known from Nixdorf A. G.

The problem with Wyse height adjustable base is the demanding physical stresses that the major components are subjected to in order to provide the somewhat limited range of height adjustments permitted by the design. The height adjustable base of Wyse adjusts from a minimum of just over three inches to a maximum of over ten inches to the top of the tilt and swivel platform. This adjustment range of seven inches exceeds the range necessary to compensate for differences in the heights of seated operators, and, therefore, makes unduly stringent demands upon the component design.

The height adjustable base of Wyse uses a torsion spring to counterbalance the weight of the adjustable arms, the tilt and swivel platform, and the display. Because of the range of motion, i.e. heights, through which the torsion spring must provide a counterbalancing force, the torsion spring must be very strong. Furthermore, to prevent too much stress in one area, the torsion spring is fitted with a force spreading cylinder and cap mechanism. The inner arm of the parallel pair is the one which is spring loaded. Spring loading the inner arm of the parallel pair reduces slightly the amount of counterbalancing force required by slightly reducing the distance between the torsion spring and the weight of the tilt and swivel platform and the display mounted thereon. The outer arm of the pair is not spring loaded and is included in order to keep the orientation of the tilt and swivel platform constant throughout all height adjustments. This design of Wyse places a substantially large counterbalancing spring mechanism on the inner side, i.e. beneath, the outer parallel arm. Thus, in order to accommodate the counter-balancing spring and the spring mechanism, the device of Wyse necessarily mounts the hinges connecting the inner arm and the outer arm to the base in a relatively high position from the bottom of the base. The result of this design configuration is the limited minimum height of adjustment which the device exhibits.

Besides the problem of a limited minimum height, the design of Wyse additionally has a cost problem. In order to have sufficient strength to provide a counterbalance throughout all height adjustments, the torsion spring and the numerous components associated therewith are of an all metal manufacture. These components, therefore, have a higher cost to manufacture and assemble than is desirable.

Another height adjustable base has been sold by Telefon AB L M Ericsson, Stockholm, Sweden. An illustration thereof appears in the March 1985 issue of BYTE on page 47. It can be seen from this illustration that this configuration is substantially similar to that of the Nixdorf A G base, with substantially similar problems of size and cost.

Thus, it is an object of this invention to provide a compact height adjustable base for a display that does not take up a lot of workspace.

It is another object of this invention to provide a compact height adjustable base that adjusts from a low minimum height to a height which compensates for the differences in the stature of seated operators.

It is a further object of this invention to provide a cost effective, inexpensive to manufacture, and easy to assemble height adjustable base for a display.

SUMMARY

Briefly stated in accordance with one aspect of the invention, the aforementioned objects are achieved by providing a height adjustable base for supporting a display including a base having a recess therein, and a first hinge joint and a second hinge joint attached to the base. A bracket is mounted in the recess and is fastened to the base. A first arm is connected at its lower end to the first hinge joint, and a second arm, located below said first arm, is connected at its lower end to the second hinge joint. A mounting platform, having a third hinge joint and a fourth hinge joint attached thereto is connected to the first and second arms. The first arm is connected at its upper end to the third hinge joint, and the second arm is connected at its upper end to the fourth hinge joint. A counterbalancing force for supporting the display is provided by a torsion spring. This torsion spring has one first end bearing against the bracket and another end bearing against the first arm to provide the counterbalancing force for the display.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 2 is a partly broken away side view of the embodiment of FIG. 1 with the arm extended;

DESCRIPTION OF A PREFERRED EMBODIMENT

Figure 1:
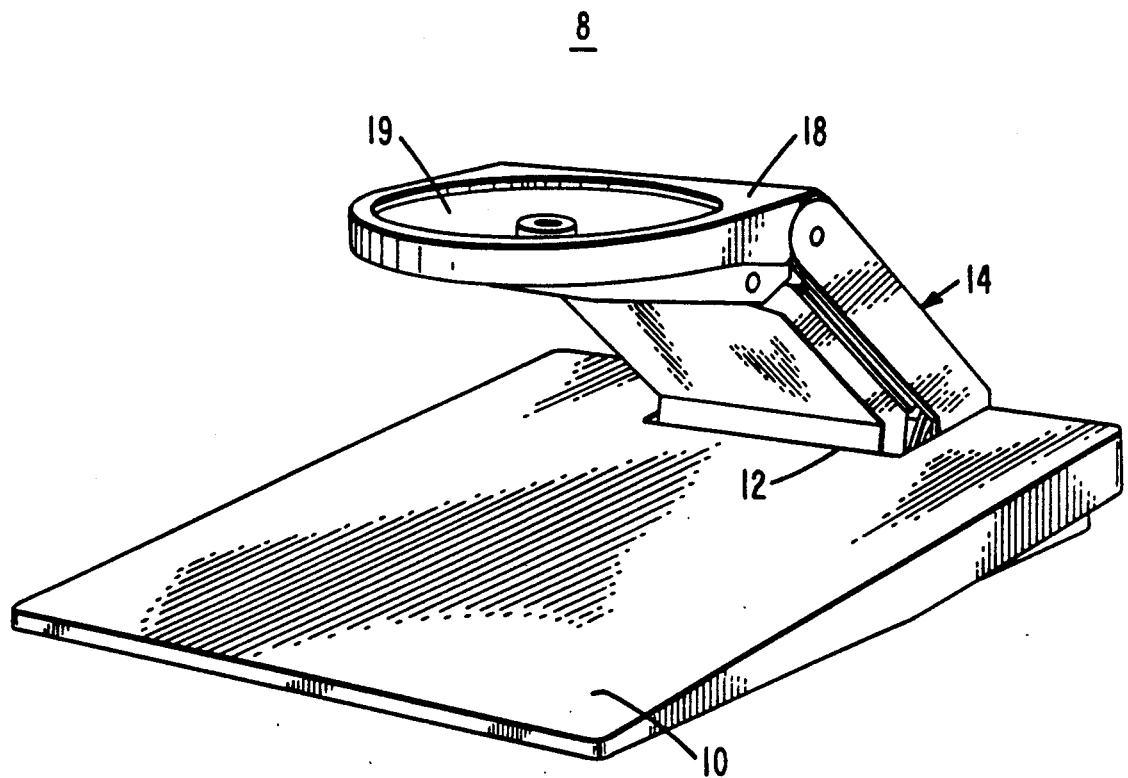
FIG. 1 is a perspective view of one embodiment of the invention with the arm extended.
Figure 4:
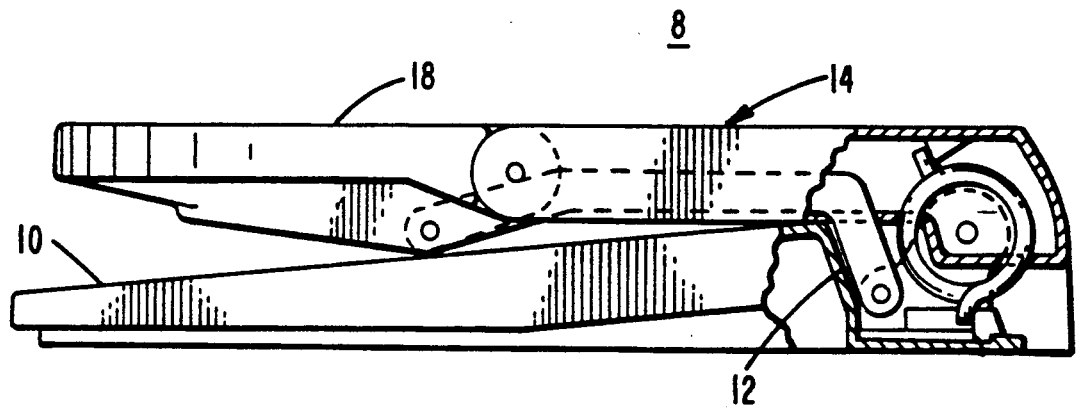
FIG. 4 is a partly broken away side view of the embodiment of FIG. 1 with the arm lowered.

Referring now to FIG. 1, there is shown a height adjustable base 8. The height adjustable base 8 has a base unit 10 which has a recess 12 at the rear portion thereof. Connected to the base unit 10 is an adjustable arm 14. The adjustable arm 14 is connected to a mounting platform 18 for a video display. The base unit 10 has length and width dimensions which are sufficiently large to prevent the video display, when attached, from tipping over in any possible adjusted height position. A concave surface 19 in mounting platform 18 cooperates with a partially spherical surface of the video display (not shown) to permit a tilting and swiveling mechanism for adjusting the orientation of the display screen relative to the viewer. This tilting and swiveling mechanism is located at the top of the arm 14 to allow for reductions in the size of the base unit 10 relative to the other style base units mentioned above. The base unit 10 is designed to be sufficiently narrow and low so that it will partially slide under a keyboard (not shown) when the keyboard is tilted forward (with its rear portion raised) for use by an operator.

Referring now to FIG. 2, further details of the invention are shown in this partially cut away side view. The adjustable arm 14 is composed of two main components: an upper arm 20 and a parallel arm 22. The upper arm 20 is connected at one end to the base unit 10 by a hinge joint 24. At another end, the upper arm 20 is connected to the mounting platform 18 by a hinge joint 26. The parallel arm 22 is similarly connected at one end to the base unit 10 by a hinge joint 28. At another end, the parallel arm 22 is also connected to the mounting platform 18 by a hinge joint 30.

Figure 3:
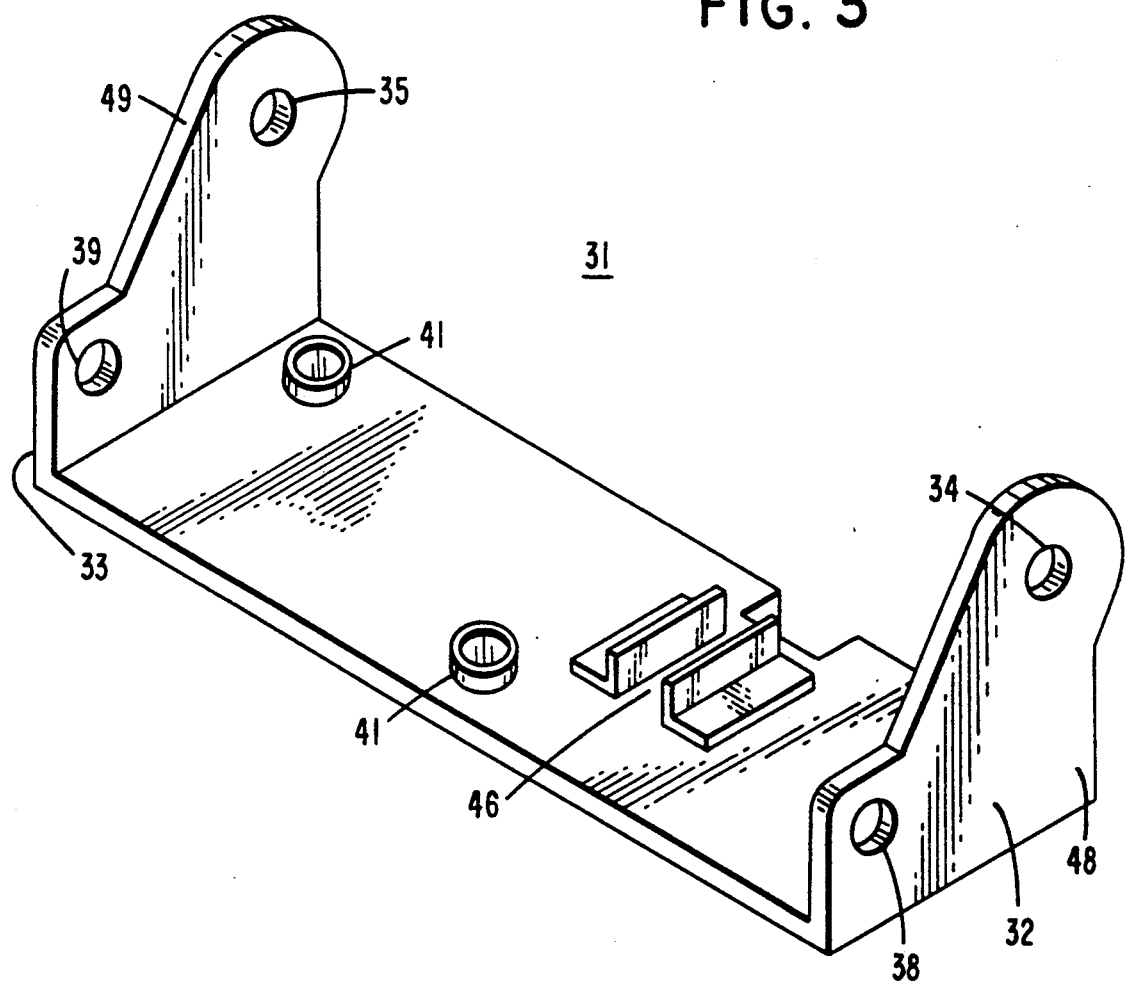
FIG. 3 is a perspective view of a bracket according to an embodiment of the invention.

Referring now to FIG. 3, a bracket 31 is shown in a perspective view. The bracket 31 has an upper pair of holes 34, 35 and a lower pair of holes 38, 39 in vertical portions 48, 49. The bracket 31 additionally has a number of holes 41 into which fasteners may be inserted to fasten the bracket 31 to the base 10. Further, a receiving guide 46 is formed on the bracket 31 by any of a number of known ways. For the embodiment shown in FIG. 3, the guide 46 could have been cast, machined, or welded; and other variations of how to form such a feature are known in the art.

Referring to FIGS. 2 and 3, the bracket 31 is connected to the base unit 10. A hinge pin 36 is mounted in the upper pair of holes 34, 35 in one embodiment of the hinge joint 24. Similarly, a hinge pin 40 is mounted in the lower pair of holes 38, 39 in the bracket 31 to form the hinge joint 28. The bracket 31 has a torsion spring 42 mounted thereon. One end 43 of the torsion spring 42 is connected to the base unit 10, and another end 44 of the spring 42 is connected to the upper arm 20. In the embodiment shown in FIG. 2, the torsion spring 42 is connected to the base unit 10 by the receiving guide 46 on the bracket 31, although those skilled in the art will appreciate that there are other methods of connecting the torsion spring to the base unit 10. The use of the bracket 31 simplifies the assembly of the height adjustable base 8, but could conceivably be eliminated by forming the hinges 24, 28 as an integral part of the base unit 10.

As shown in FIG. 2, the connection between the upper arm 20 and the mounting platform 18 at hinge joint 26 is effected by a hinge pin 50. Likewise, the connection between the parallel arm 22 and the mounting platform 18 is effected by a hinge pin 52.

The preferred embodiment of height adjustable base 8 is designed to carry a display (not shown) which has a pre-determined size and weight. All the components of the height adjustable base 8 are selected to adjustably support the pre-determined size and weight of a specific display, although some variations are permitted. The hinge joints 24, 26, 28, and 30 are spaced to cooperate with one another to allow the mounting platform 18 to be raised or lowered relative to the base unit 10. The direct distance between hinge joint 24 and hinge joint 26 on upper arm 20 is the same as the direct distance between hinge joint 28 and hinge joint 30 on the parallel arm 22. The position and spacing of the hinge joints 26, 30 on the mounting platform 18 are selected such that the horizontal orientation of the mounting platform 18 with respect to the base unit 10 will remain constant through any and all height adjustments.

The torsion spring 42 provides a counter-balancing force for the combined weight of the upper arm 20, the parallel arm 22, the mounting platform 18, and the display (not shown). The spring constant and dimensions of the spring are selected such that the counterbalancing force provided thereby is slightly in excess of the combined weight that it supports, but substantially the same as the sum of the combined weight and the friction forces acting upon the hinge joints 24, 26, 28, 30. In this manner, the display is easily adjusted to the most convenient height for viewing by the operator and it will maintain that height without any undesired movement.

By not requiring an unduly large height adjustment range, the counterbalance spring 42 can be made smaller and located to work with the the outer arm 20 of the parallel arms 20,22. This configuration allows a lower positioning of the hinge points of the parallel pair of arms. This lower position allows a desired, lower minimum level of height adjustment as shown in FIG. 3.

Similarly, by not requiring an unduly large height adjustment range and by reducing the forces which must be counterbalanced by the torsion spring 42, the stress demands on the spring/hinge mechanism are reduced. This obviates the need for discrete force spreading devices such as the cylindrical spring mount and the cylindrical cap known from the device of Wyse. The reduced stress demands allow the present invention to use fewer and less expensive components in its manufacture, and thereby lead to a lower consumer price.

Thus, it will now be understood that there has been disclosed a height adjustable base for a display which allows height adjustments to compensate for differences in keyboard-display operators which is compact in size and which is low in manufacturing and assembly costs.

As will be evident from the foregoing description, certain aspects of the invention are not limited to the particular details of the example illustrated, and it is therefore contemplated that other modifications or applications will occur to those skilled in the art. It is accordingly intended that the claims shall cover all such modifications and applications which do not depart from the true spirit and scope of the invention.

What is claimed as new and desired to be secured by Letters Patent of the United Sates is:

1. A height adjustable base for supporting a display, comprising:
   a base having a recess therein;
   a bracket mounted in said recess and fastened to said base;
   a first hinge joint and a second hinge joint attached to said bracket;
   a first arm connected at a lower end to said first hinge joint;
   a first hinge pin connecting said first hinge joint to said lower end of said first arm;
   a second arm, located below said first arm, connected at a lower end to said second hinge joint;
   a second hinge pin connecting said second hinge joint to said lower end of said second arm;
   a mounting platform;
   said mounting platform having a concave surface therein for mounting a display with a rounded tilt and swivel portion;
   a third hinge joint and a fourth hinge joint attached to said mounting platform;
   said first arm connecting to said third hinge joint at an upper end thereof;
   a third hinge pin connecting said third hinge joint to said upper end of said first arm;
   said second arm connecting to said fourth hinge joint at an upper end thereof;
   a fourth hinge pin connecting said fourth hinge joint to said upper end of said second arm; and
   a torsion spring having a first end bearing against said bracket and a second end bearing against said first arm to provide a counterbalancing force supporting the display.

2. A height adjustable base for supporting a display, comprising:
   a base having a recess therein;
   a first hinge joint and a second hinge joint attached to said base;
   a first arm connected at a lower end to said first hinge joint;
   a first hinge pin connecting said first hinge joint to said lower end of said first arm;
   a second arm, located below said first arm, connected at a lower end to said second hinge joint;
   a second hinge pin connecting said second hinge joint to said lower end of said second arm;
   a mounting platform;
   said mounting platform having a concave surface therein for mounting a display with a rounded tilt and swivel portion;
   a third hinge joint and a fourth hinge joint attached to said mounting platform;
   said first arm connecting to said third hinge joint at an upper end thereof;
   a third hinge pin connecting said third hinge joint to said upper end of said first arm;
   said second arm connecting to said fourth hinge joint at an upper end thereof;
   a fourth hinge pin connecting said fourth hinge joint to said upper end of said second arm; and
   a torsion spring having a first end bearing against said base and a second end bearing against said first arm to provide a counterbalancing force supporting the display.

3. A height adjustable base for supporting a display, comprising:
   a base having an inclined top surface;
   said inclined top surface having a recess therein;
   a bracket mounted in said recess and fastened to said base;
   a first hinge joint and a second hinge joint attached to said bracket;
   a first arm connect at a lower end to said first hinge joint;
   a second arm, located below said first arm, connected at a lower end to said second hinge joint;
   a mounting platform;
   a third hinge joint and a fourth hinge joint attached to said mounting platform;
   said first arm connecting to said third hinge joint at an upper end thereof;
   said second arm connecting to said fourth hinge joint at an upper end thereof; and
   a torsion spring having a first end bearing against said bracket and a second end bearing against said first arm to provide a counterbalancing force supporting the display.

4. A height adjustable base, as set forth in claim 3, further comprising:
   a first hinge pin connecting said first hinge joint to said lower end of said first arm;
   a second hinge pin connecting said second hinge joint to said lower end of said second arm;
   a third hinge pin connected said third hinge joint to said upper end of said first arm; and
   a fourth hinge pin connecting said fourth hinge joint to said upper end of said second arm.

5. A height adjustable base, as set forth in claim 3, wherein said hinge joints and said arms cooperate to maintain a horizontal orientation of the mounting platform relative to the base constant throughout a height adjustment.

6. A height adjustable base, as set forth in claim 5, wherein said mounting platform has a concave surface therein for mounting a display with a rounded tilt and swivel portion.

7. A height adjustable base, as set forth in claim 6, wherein a first distance between said first and second hinge joints, and a second distance between said third and fourth hinge joints are equal.

8. A height adjustable base, as set forth in claim 7, wherein said counterbalancing force supplied by said torsion spring is substantially the same as, and slightly in excess of the combined force from the weight of said first arm, said second arm, said mounting platform and the display.

9. A height adjustable base, as set forth in claim 8, wherein said inclined top surface is adapted to provide clearance for said mounting platform in a fully lowered position such that said mounting platform and said first arm lie in a common horizontal plane.

10. A height adjustable base for supporting a display, comprising:
   a base having an inclined top surface;
   said inclined top surface having a recess therein;
   a first hinge joint and a second hinge joint attached to said base;
   a first arm connected at a lower end to said first hinge joint;
   a second arm, located below said first arm, connected at a lower end to said second hinge joint;
   a mounting platform;
   a third hinge joint and a fourth hinge joint attached to said mounting platform;
   said first arm connecting to said third hinge joint at an upper end thereof;
   said second arm connecting to said fourth hinge joint at an upper end thereof; and
   a torsion spring located at least partially in said recess and having a first end bearing against said base and a second end bearing against said first arm to provide a counterbalancing force supporting the display.

11. A height adjustable base, as set forth in claim 10, further comprising:
   a first hinge pin connecting said first hinge joint to said lower end of said first arm;
   a second hinge pin connecting said second hinge joint to said lower end of said second arm;
   a third hinge pin connected said third hinge joint to said upper end of said first arm; and
   a fourth hinge pin connecting said fourth hinge joint to said upper end of said second arm.

12. A height adjustable base, as set forth in claim 11, wherein aid hinge joints and said arms cooperate to maintain a horizontal orientation of the mounting platform relative to the base constant throughout a height adjustment.

13. A height adjustable base, as set forth in claim 12, wherein said mounting platform has a concave surface therein for mounting a display with a rounded tilt and swivel portion.

14. A height adjustable base, as set forth in claim 13, wherein a first distance between said first and second hinge joints, and a second distance between said third and fourth hinge joints are equal.

15. A height adjustable base, as set forth in claim 14, wherein said counterbalancing force supplied by said torsion spring is substantially the same as, and slightly in excess of the combined force from the weight of said first arm, said second arm, said mounting platform and the display.

16. A height adjustable base, as set forth in claim 15, wherein said inclined top surface is adapted to provide clearance for said mounting platform in a fully lowered position such that said mounting platform and said first arm lie in a common horizontal plane.

* * * * *

UNITED STATES PATENT AND TRADEMARK OFFICE
CERTIFICATE OF CORRECTION

PATENT NO. : 5,088,676

DATED : February 18, 1992

INVENTOR(S) : Anthony R. Orchard, et al.

It is certified that error appears in the above-identified patent and that said Letters Patent is hereby corrected as shown below:

Column 6, line 41, delete "connect" and substitute --connected--.

Column 6, line 62, delete "connected" and substitute --connecting--.

Column 8, line 17, delete "aid" and substitute --said--.

Signed and Sealed this

Thirteenth Day of April, 1993

Attest:

STEPHEN G. KUNIN

*Attesting Officer*  *Acting Commissioner of Patents and Trademarks*